United States Patent [19]

Elfner et al.

[11] 4,413,325
[45] Nov. 1, 1983

[54] METHODS AND APPARATUSES FOR DETERMINING THE TEMPERATURE OF AN ASYNCHRONOUS MOTOR

[75] Inventors: Bo Å. Elfner; Anders P. P. Comstedt, both of Löddeköpinge, Sweden

[73] Assignee: EL-FI Innovationer AB, Helsingborg, Sweden

[21] Appl. No.: 246,949

[22] Filed: Mar. 24, 1981

[30] Foreign Application Priority Data

Mar. 26, 1980 [SE] Sweden .................. 8002309

[51] Int. Cl.³ .................. G06F 15/20; H02H 7/08
[52] U.S. Cl. .................. 364/557; 361/25; 361/30
[58] Field of Search .................. 364/557; 361/24, 25, 361/26, 30; 318/434

[56] References Cited

U.S. PATENT DOCUMENTS 4,291,355  9/1981  Dinger .................. 361/25 X
4,319,298  3/1982  Davis et al. .................. 361/24

Primary Examiner—Jerry Smith
Attorney, Agent, or Firm—Cushman, Darby and Cushman

[57] ABSTRACT

The winding temperature of an asynchronous motor is determined for control as regards overheating, in that a value representing the prevailing motor resistance is calculated on the basis of the amplitude of the voltage (2) impressed on the motor, the amplitude of the motor current (1), the phase angle (8) between the voltage and the current, as well as the slip (3), derived from overtones in the current flowing in the input lines to the motor. The resistance value is converted (15) to a corresponding temperature value which is used for updating a winding temperature value produced in parallel on the basis of the difference between the dissipated power and the cooling loss power, when the slip lies within predetermined limits.

6 Claims, 4 Drawing Figures

METHODS AND APPARATUSES FOR DETERMINING THE TEMPERATURE OF AN ASYNCHRONOUS MOTOR

The present invention relates in general to motor protection for asynchronous motors. More precisely, the present invention relates to a method and an apparatus for determining, for purposes of control, the temperature of an asynchronous motor, such that the motor may be protected from overloading.

At the present time, asynchronous motors are the cheapest and most durable of electric motors. However, as the temperature in the windings increases, the life of the insulation in the coils is reduced, that is to say it is broken down more rapidly at higher temperatures. In order to ensure the desired working life, it is desirable, therefore, to monitor the winding temperature, so that this temperature can be prevented from increasing to unacceptable levels.

There are a number of different methods for determining the winding temperature of the motor. The currently most widely employed method is that of calculating the time integral of the difference between the dissipated power and the cooling loos power, that is to say the integral $\int K_1(I^2=K_2\Delta T)dt$, in which the dissipated power is assumed to be proportional to the square of the value I of the motor current, and the cooling loss power is assumed to be proportional to the difference $\Delta T$ between the temperature of the motor winding and the ambient temperature. The value of this time integral is normally obtained by means of bimetal relays in which the bimetal is heated up by the motor current and cooled down by the ambient air. The disadvantage inherent in this method resides in the inevitable differences between the motor and the bimetal relays as regards the time constants for heating and cooling, as well as the ambient temperature.

By employing electronic equipment which is based on the same principles as described above, better agreement can, granted, be achieved with the parameters of the motor, but it is still necessary to make a number of assumptions regarding, for example, the ambient temperature and cooling rate.

If it is desired to obtain a more accurate determination of the motor temperature, there remains no other possibility, at the time of writing, than the mounting of some form of thermometer in the motor proper. For example, thermistors can be embedded in the winding and connected to exterior equipment which calculates the temperature on the basis of the resistance changes of the thermistor. Certainly, this mode of operation gives a correct value of the motor temperature, but is requires a separate cable out to the exterior evaluation equipment. Shotcomings in the standardization of thermistors and connection methods, as well as the need to select thermistors at the time of manufacture of the motor are other disadvantages.

One object of the present invention is, therefore, to realize a motor overload protector which requires no extra cables to the motor and nevertheless provides a true picture of the temperature in the motor.

This and other objects of the present invention will be attained by means of the method and apparatus for determining, for purposes of control, the winding temperature of an asynchronous motor. According to the invention, a value representing the prevailing motor resistance is calculated from the voltage impressed on the motor and the current flowing in the input lines of the motor, and a corresponding winding temperature value is derived from the thus calculated resistance value.

Hence, the present invention employs a known model of a motor wherein the motor may be represented by an equivalent circuit wherein the motor's resistances are both temperature-dependent and speed-dependent. Using the knowledge of prevailing values of the resistance and speed of revolution of the motor it is, thus, possible to determine the motor temperature.

The nature of the present invention and its aspcts will be more readily understood from the following brief description of the accompanying drawings, and discussion relating thereto.

Figure 1:
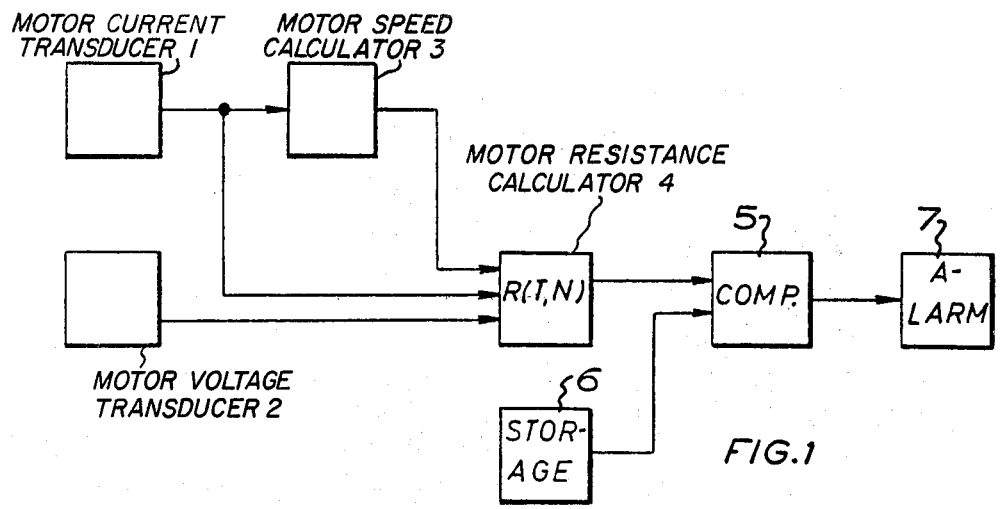
FIG. 1 is a block diagram showing a fundamental embodiment of the apparatus according to the invention.

The apparatus shown in FIG. 1 comprises a first transducer 1 which emits a signal corresponding to the motor current, and a second transducer 2 which emits a signal corresponding to the motor voltage. A first calculator circuit 3 is coupled to the output of the transducer 1 and calculates the speed of the motor on the basis of the overtone content of the mtoro current which is dependent upon the slip and, thereby, the speed of the motor. A more detailed description of how this calculation is made is to be found in our copending U.S. patent application Ser. No. 246,946, entitled "A Method and Apparatus for Detecting the Speed of an Asynchronous Motor" and now U.S. Pat. No. 4,358,734. The disclosure of that application is incorporated herein by reference as if fully reproduced. A second calculator circuit 4 is coupled to the outputs of the transducers 1 and 2, as well as to the output of the calculator circuit 3 for calculating the prevailing values of the motor resistance on the basis of the input signals from these units. In a comparator 5 following on the calculator circuit 4, the values produced in the calculator circuit 4 are compared with reference values which are obtained from a memory 6. If the calculated prevailing values exceed the reference values, an alarm circuit 7 is triggered.

Figure 2:
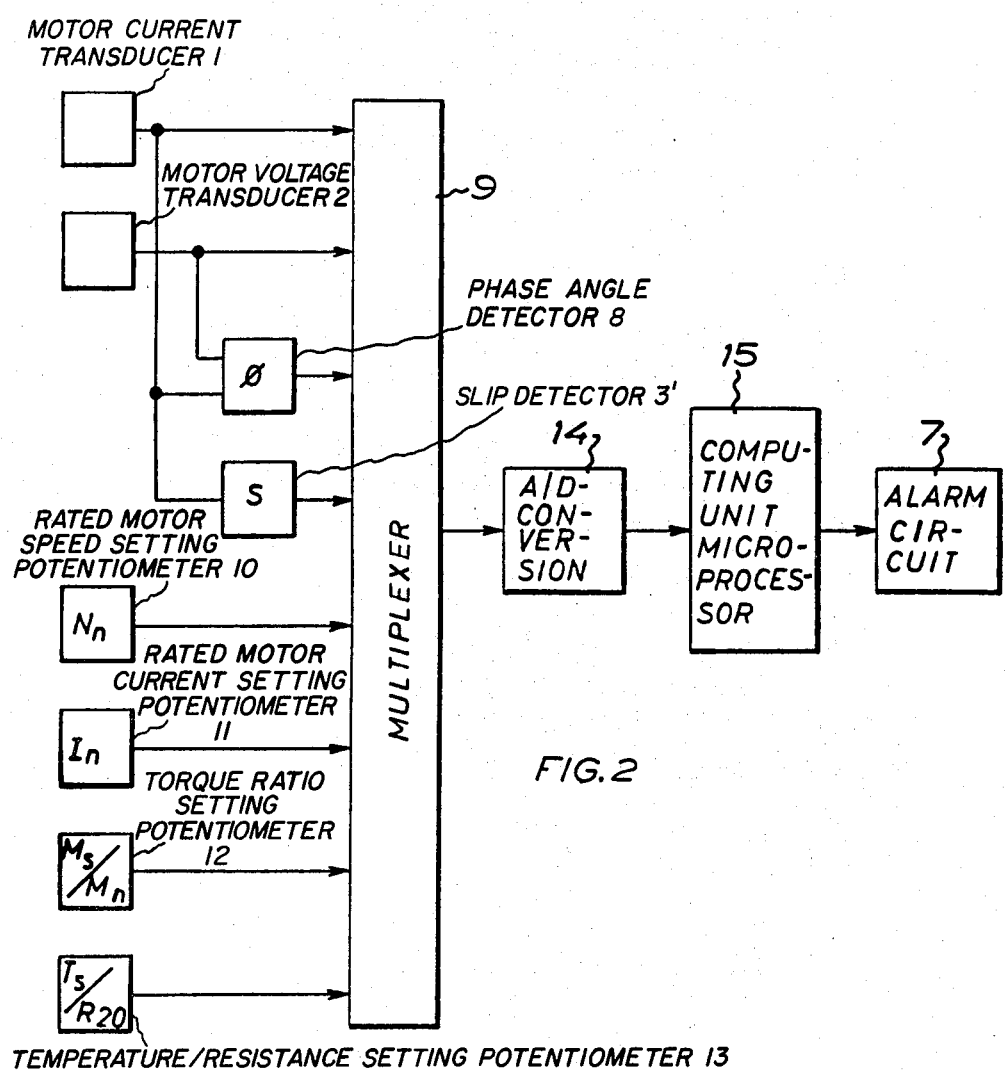
FIG. 2 is a block diagram showing a preferred embodiment of the apparatus according to the invention.

The preferred embodiment of the apparatus according to the invention is illustrated in FIG. 2 and comprises the same transducers 1 and 2 as in the apparatus according to FIG. 1, as well as one calculator unit 3' for producing a value representing motor slip s. The apparatus according to FIG. 2 further comprises a phase determining unit 8 which receives the output signals from the transducers 1 and 2 and emits a value which corresponds to the phase shift between the motor current and the motor voltage. The outputs of the units 1, 2, 3 and 8 are connected to inputs to a multiplexer 9 having a plurality of further inputs which are connected to setting means 10–13 in the form of potentiometers for manual setting of the values on the rated speed $N_n$ of the motor, the rated current $I_n$ of the motor, the ratio of start torque and torque at rated load $M_s/M_n$, as well as the start temperature $T_{start}$ and the motor resistance at 20° C. $R_{20}$. The output of the multiplexer 9 is connected, via an analogue-to-digital converter 14, to the input of a calculator unit 15 which contains a microprocessor. The calculator unit 15 has, as output circuit, an alarm circuit 7, like the apparatus according to FIG. 1.

The mode of operation of the apparatus of FIG. 2 may be divided into two phases, namely an initiation phase or start-up phase and a normal duty phase.

Figure 3:
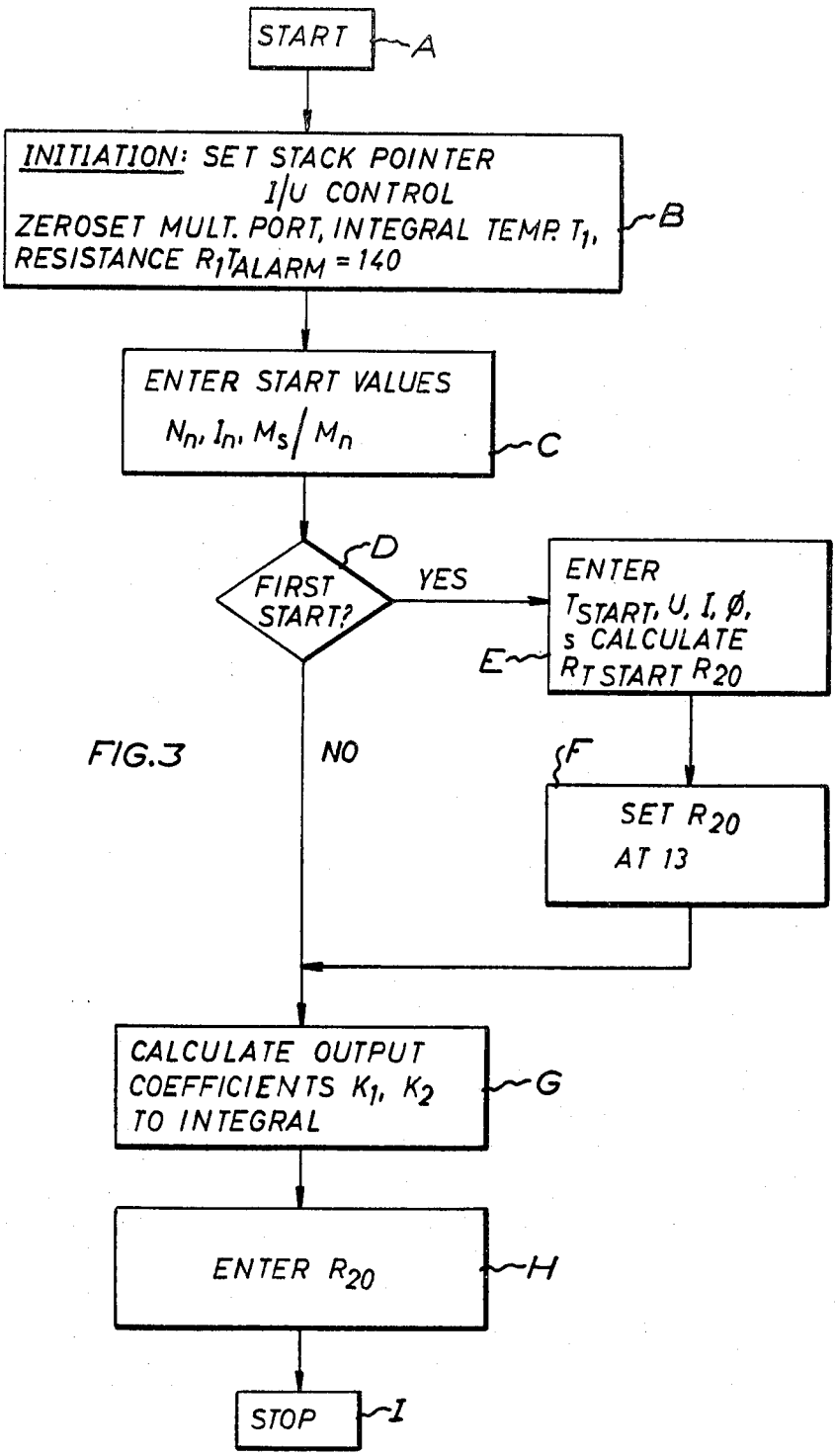
FIG. 3 is a flow diagram for the first start-up of the apparatus according to FIG. 2.

A flow diagram of the start-up phase is shown in FIG. 3. As illustrated, a transfer takes place from the start block A proper to an initiation block B. This latter serves merely to prepare the calculator unit 15 in that certain cells are provided with requisite values in order that it be possible to run through subsequent programs. Flow diagram blocks B-I constitute the start-up routine proper. As a first step, the values of the rated speed $N_n$, the rated current $I_n$, the start torque/torque at rated load $(M_s/M_n)$, as well as the ambient, or start temperature $T_{start}$ are entered in the block C. Furthermore, a switching device marks that this is a matter of a first start. The set values are coupled, by the intermediary of the analogue multiplexer 9 and analogue-to-digital converter 14, to the calculator unit 15 where they are stored in suitable memory cells. The value $M_s/M_n$ is first converted into a value Q which corresponds to the relationship $R_1/R_2$ between the stator resistance and the rotor resistance. In a decision block D it is established whether this is a question of a first start or not. If it is a first start, transfer is effected to a block E where the values from the transducers 1 and 2 are entered into the calculator unit 15, like the values from the units 3, 8 and 13. With these values, the calculator unit can calculate the equivalent resistance of the motor at the temperature $T_{start}$ as $R = U/(I \cdot \cos \phi) \cdot Q \cdot (1+s)/s$, like the corresponding resistance at 20° C. ($R_{20}$) according to the formula:

$$R = R_{20}(1 + \alpha(T_{start} - 20)),$$

wherein $\alpha \approx 0.0039$.

By means of the potentiometer 13, the value of the motor resistance at 20° C. is now set. This is effected with the assistance of a light emitting diode (not shown) which is extinguished when the potentiometer 13 has been set at the correct position. A transfer from the thus passed block F takes place to block G. If the above-mentioned switching device in block C had not been set for indicating a first start, transfer would have been effected directly via block D to block G, that is to say the potentiometer 13 would have been assumed to be correctly set at the value for the motor resistance at 20° C. In the block G, there is effected a calculation of output coefficients for the integral mentioned by way of introduction, which, more correctly put in this case by digitalization has the form of a sum:

$$\Sigma K_1(I^2 - K_2 \Delta T)\Delta t$$

wherein $K_1$ and $K_2$ are dependent upon the thermal properties, mass, material and cooling of the motor. Modern asynchronous motors present a similar picture as regards these units, and the most decisive factor is the total size of the motor. A good measurement of this is the rated current of the motor, for which a value has already been entered in the calculator unit 15. With the assistance of this value, one value for the constant $K_1$ and two values for the constant $K_2$ are produced, that is to say one value for a running motor and one for a stationary motor, since the cooling in these two cases is different.

After transfer to the step H, the value of $R_{20}$ is entered from the potentiometer 13 by the intermediary of the multiplexer 9 and analogue-to-digital converter 14 into the calculator unit 15. This value is stored in a suitable memory cell in the calculator unit 15, whereafter the start-up phase is finished.

Figure 4:
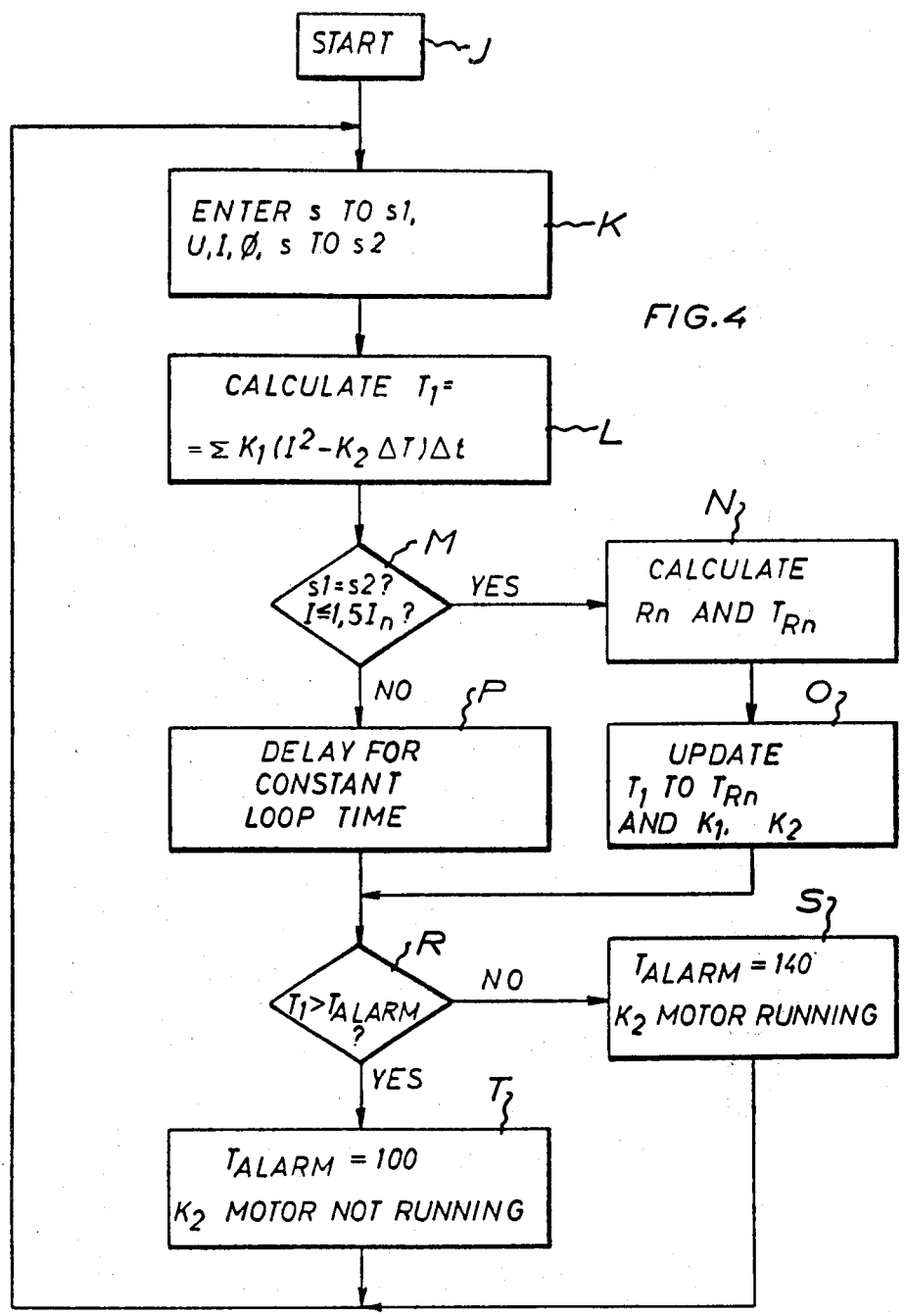
FIG. 4 is a flow diagram showing the mode of operation of the apparatus under continous duty.

The calculator unit 15 passes then to the duty program proper, whose flow diagram is shown in FIG. 4. In a first block K in the duty program, information is entered in the same manner as was described above in conjunction with block E. However, the entering sequence differs, in that the values of the slip s are included both as first and last value for comparison with each other.

In a block L, the partial sum $K_1(I^2 - K_2 \cdot \Delta T)$ is calculated and added to the previously derived sum $\Sigma K_1(I^2 - K_2 \Delta T)\Delta t$ representing the temperature of the motor winding.

In order that the winding temperature value produced on the basis of the motor resistance be meaningful, it is necessary that the slip value s really is the correct one, and that the operating conditions have been static during the short time when data entering took place, since the value for the slip s is to be the same both before and after the entering the data. A further condition for the correctness o the entered value of the slip s is that the motor current does not exceed the rated current by more than about 50%. In the block M a check is effected to see whether these two conditions are satisfied. If the conditions are satisfied, transfer is effected to a block N in which the same resistance calculation takes place as in the above-mentioned block E. In order to reduce the effect of possibly incorrect values or rounding-off errors, a mean value calculation is carried out according to the formula:

$$R_n = (15/16)R_{n-1} + (1/16)R$$

wherein R is the last calculated resistance value. The value $R_n$ is subsequently converted into a temperature value in the same manner as in the above-mentioned block E.

In a block O, the temperature value calculated in block N is compared with the value in block L which is produced by adding partial sums. The value produced by adding is updated to the value produced as a result of the resistance determination. Moreover, the "coefficient of cooling" $K_2$ can be updated. Thereafter, transfer is effected to a decision block R.

If the conditions tested in block M are not satisfied, transfer is effected to the element R direct by the intermediary of a block P which introduces a delay time for realizing constant loop time independent of the result of the decision in block M.

In block R the prevailing temperature value is compared with an alarm temperature $T_{alarm}$. If the prevailing temperature value does not exceed the alarm temperature, the alarm circuit 7 is not energized, $T_{alarm}$ is set at, for example, 140° C., and, during the subsequent execution, use is made of that value of $K_2$ which corresponds to a running motor. If the prevailing temperature is higher than the alarm temperature, transfer from the element R to a block T takes place, in which the alarm circuit 7 is energized, $T_{alarm}$ is set at, for example, 100° C., and that value of $K_2$ which corresponds to a stationary motor is used during the subsequent execution. By energization of the alarm circuit 7, the motor will be stopped. When the motor is stationary, it would not be possible to use the resistance calculation for ascertaining the motor temperature. Instead, use is made of that temperature value which is obtained by the totalling calculation in the block L. From the blocks S and T, return is effected to the block K, whereafter the duty program is repeated.

To sum up, determination of the winding temperature of an asynchronous motor according to the invention can be said to be effected as a result of repeated derivation of the value of the above-mentioned integral or sum and by updating the thereby obtained temperature value by means of a winding temperature based on a determination of the prevailing resistance value of the motor.

We claim:

1. Apparatus for protecting an asynchronous motor from thermal overload, comprising:
   (a) means for applying electric power to said motor;
   (b) motor current transducer means, coupled to said power applying means, for detecting a current drawn by said motor and providing a current signal indicative thereof;
   (c) motor voltage transducer meas, coupled to said power applying means, for detecting a voltage drop across said motor and providing a voltage signal indicative thereof;
   (d) phase angle detector meas, coupled to said current and voltage transducer means, for measuring a phase agle difference between said current and voltage signals and providing a phase signal indicative thereof;
   (e) slip detector means, coupled to said current transducer means, for determining an amount of slip of said motor and providing a slip signal indicative thereof;
   (f) means for setting a value of rated motor speed;
   (g) means for setting a value of rated motor current;
   (h) means for setting a torque ratio value equal to $M_s/M_n$ where $M_s$ represents a motor starting torque and $M_n$ represents a motor torque at rated load;
   (i) means for setting a temperature $T_{start}$ value and a resistance $R_x$ value wherein $T_{start}$ represents a motor starting temperature and $R_x$ represents motor resistance at a predtermined temperature x;
   (j) multiplexer means, having respective inputs coupled to said motor current transducer means, motor voltage transducer means, phase angle detector means, rated motor speed value setting means, rated motor current value setting meas, torque ratio setting means and temperature/resistance value setting means, for multiplexing their respective signals onto an output line;
   (k) A/D conversion means, coupled to said multiplexer means output line, for generating digital data signals corresponding to values of said signals coupled to said multiplexer inputs;
   (l) processing means, coupled to an output of said A/D conversion means, for processing said digital data signals to repeatedly determine a winding temperature of said motor and compare the repeatedly determined winding temperature with a previously stored reference value and generating an alarm signal when said winding temperature exceeds said reference value, thereby indicating a thermal overload condition.

2. An apparatus according to claim 1 wherein said processing means includes means for processing said data in a start-up mode, comprising:
   (m) means for storing the values defined by said rated motor speed value setting means, rated motor current value setting means, torque ratio value setting means and $T_{start}$ value setting means;
   (n) means for converting said torque ratio into a value Q representing a resistance ratio $R_1/R_2$ between stator and rotor resistance of said motor;
   (o) means for determining whether this is a first motor start;
   (p) means for determining, in the event of a first start, an equivalent resistance of the motor at $T_{start}$;
   (q) means for repeatedly comparing the set value of $R_x$, user set by said paragraph (i) means with said equivalent resistance as determined by said paragraph (p) means and indicating when said resistance value setting means is set to correspond to the value of equivalent resistance;
   (r) means for determining coefficients for use in determining a summation of the differences between dissipated power and cooling loss power of said motor; and
   (s) means for storing the value of equivalent resistance $R_x$.

3. An apparatus according to claim 2 wherein said processing means further includes means for processing data in a duty mode following processing in said start-up mode, comprising:
   (t) means for storing values of current, voltage, phase angle and slip provided by said motor current transducer means, motor voltage transducer means, phase angle detector means and slip detector means including at least two slip values taken at different times;
   (u) means for calculating using said coefficients, determined by said paragraph (r) means a first temperature value $T_1$ equal to a partial sum of the difference between dissipated power and cooling loss power of said motor;
   (v) means for determining whether slip has remained static by comparing said at least two slip values taken at different times and whether motor current does not exceed a predetermined percentage of rated motor current as set by said rated motor current setting means,
   (w) means for calculating in the event that the conditions of paragraph "v" are satisfied, a value of motor resistance and winding temperature $T_R$ corresponding thereto;
   (x) means for comparing $T_R$ with $T_1$ and updating the value $T_1$ to the value $T_R$ and redetermining said coefficients;
   (y) means for introducing a response delay in the event that the conditions of paragraph "v" are not satisfied; and
   (z) means, responsive to said paragraph "x" means or said paragraph "y" means for comparing said updated value $T_1$ with a predetermined alarm limit and generating an alarm signal in the event said limit is exceeded.

4. A method for protecting an asynchronous motor from thermal overload comprising the steps of:
   (a) applying power to said motor;
   (b) detecting current drawn by said motor and providing a current signal indicative thereof;

(c) detecting a voltage drop across said motor and providing a voltage signal indicative thereof;

(d) determining from said current and voltage signals a phase angle difference therebetween and providing a phase signal indicative thereof;

(e) analyzing said current signal to determine an amount of slip of said motor and providing a slip signal indicative thereof;

(f) predetermining a value of rated motor speed;

(g) predetermining a value of rated motor current;

(h) predetermining a torque ratio equal to $M_s/M_n$ where $M_s$ represents starting torque and $M_n$ represents torque at rated load;

(i) predetermining a temperature $T_{start}$ value and a resistance $R_x$ value wherein $T_{start}$ represents a motor starting temperature and $R_x$ represents a motor resistance at a predetermined temperature x;

(j) multiplexing said current signal, voltage signal, phase angle signal, rated motor speed, rated motor current, torque ratio and temperature/resistance values onto a data bus;

(k) converting the multiplexed signals into digital data signals corresponding to their respective analog values;

(l) processing said digital data signals to repeatedly determine a winding temperature of said motor and comparing the repeatedly determined winding temperature with a previously stored reference value and generating an alarm signal when said winding temperature exceeds said reference value, thereby indicating a thermal overload condition.

5. A method according to claim 4 wherein said processing step (l) includes a processing said data in a start-up mode comprising the steps of:

(m) storing said rated motor speed value, rated motor current value, torque ratio value and $T_{start}$ value;

(n) converting said torque ratio value into a value Q representing a resistance ratio $R_1/R_2$ between stator and rotor resistance of said motor;

(o) determining whether this is a first motor start;

(p) determining in the event of a first motor start the equivalent resistance of themotor at $T_{start}$ equal to $R_x$;

(q) adjusting said predetermined resistance value so as to be equal to the equivalent resistance of the motor at $T_{start\ equal\ to\ Rx}$ as determined at step (p) and providing an indication thereof;

(r) determining, at least in part based on said resistance ratio, coefficients for use in determining a summation of the different between dissipated power and cooling loss power of said motor; and (s) storing the value of equivalent resistance $R_x$.

6. A method according to claim 5 wherein said processing step (l) further includes processing data in a duty mode following processing in said start-up mode, comprising the steps of:

(t) storing values of current, voltage, phase angle and slip including at least two slip values taken at different times;

(u) calculating using said coefficients, a first temperature value $T_1$ equal to a partial sum of the difference between dissipated power and cooling loss power of said motor;

(v) determining whether slip has remained static by comparing said at least two slip values taken at different times and whether motor current does not exceed a given percentage of the predetermined value of rated motor current;

(w) calculating, in the event that the conditions of paragraph (v) are satisfied, a value of motor resistance and a winding temperature $T_R$ corresponding thereto;

(x) comparing $T_R$ with $T_1$ and updating the value $T_1$ to the value $T_R$ and redetermining said coefficients;

(y) introducing a response delay in the event that the conditions of paragraph (v) are not satisfied; and (z) comparing said updated value $T_1$ with a predetermined alarm limit and generating an alarm signal in the event said limit is exceeded.

* * * * *